(12) United States Patent
Ge et al.

(10) Patent No.: US 9,526,930 B2
(45) Date of Patent: Dec. 27, 2016

(54) CONTROL METHOD OF A FIRE TRUCK FOR HIGH-RISE AND SUPER HIGH-RISE BUILDING FIREFIGHTING

(71) Applicant: BEIJING MECHANICAL EQUIPMENT INSTITUTE, Beijing (CN)

(72) Inventors: Xiaofei Ge, Beijing (CN); Xuyang Qiu, Beijing (CN); Jiahui Li, Beijing, CA (US); Ke Liu, Beijing (CN); Zhengxin Li, Beijing (CN); Tao Wang, Beijing (CN); Chao Tian, Beijing (CN)

(73) Assignee: BEIJING MECHANICAL EQUIPMENT INSTITUTE, Beijing (CN)

( * ) Notice: Subject to any disclaimer, the term of this patent is extended or adjusted under 35 U.S.C. 154(b) by 0 days.

(21) Appl. No.: 14/905,669

(22) PCT Filed: Jul. 16, 2013

(86) PCT No.: PCT/CN2013/079454
§ 371 (c)(1),
(2) Date: Jan. 15, 2016

(87) PCT Pub. No.: WO2015/006916
PCT Pub. Date: Jan. 22, 2015

(65) Prior Publication Data
US 2016/0151653 A1    Jun. 2, 2016

(51) Int. Cl.
*A62C 27/00*    (2006.01)
*A62C 3/02*    (2006.01)
(Continued)

(52) U.S. Cl.
CPC ............. *A62C 3/025* (2013.01); *A62C 3/00* (2013.01); *A62C 8/005* (2013.01); *A62C 27/00* (2013.01);
(Continued)

(58) Field of Classification Search
CPC .......... A62C 3/025; A62C 27/00; A62C 3/00; A62C 37/00; A62C 8/005; G01S 17/08; G01S 17/88; A01G 25/16; B05B 12/00; E02F 9/2025; F42B 12/50
(Continued)

(56) References Cited

U.S. PATENT DOCUMENTS 3,989,109 A * 11/1976 Gagliardo ............. A62C 31/02
169/24
4,678,041 A * 7/1987 Staudinger ............. A62C 27/00
169/24
(Continued)

*Primary Examiner* — Steven J Ganey
(74) *Attorney, Agent, or Firm* — Calfee Halter & Griswold LLP

(57) ABSTRACT

The present application discloses a control method of a fire fighting truck for high-rise and super high-rise building firefighting, including: a command control equipment (2), a launch control equipment (3), a turret control apparatus (8), a photoelectric detection equipment (9), wherein the photoelectric detection equipment (9) comprises: an installing shell, a power supply, a white light zoom camera, an infrared camera, a laser rangefinder, and an integrated processing unit, the white light zoom camera is connected to the installing shell by a screw, the infrared camera is connected to the installing shell by a screw, the laser rangefinder is connected to the installing shell by a screw, a power supply interface of the white light zoom camera is connected to the power supply by a wire, a power supply interface of the infrared camera is connected to the power supply by a wire, a power supply interface of the laser rangefinder is connected to the power supply by a wire, a data interface of the
(Continued)

white light zoom camera is connected to the integrated processing unit by a wire, a data interface of the infrared camera is connected to the integrated processing unit by a wire, and a data interface of the laser rangefinder is connected to the integrated processing unit by a wire.

10 Claims, 8 Drawing Sheets

(51) Int. Cl.
| | |
|---|---|
| *A62C 8/00* | (2006.01) |
| *A62C 3/00* | (2006.01) |
| *G01S 17/08* | (2006.01) |
| *G01S 17/88* | (2006.01) |
| *B05B 12/00* | (2006.01) |
| *A62C 37/00* | (2006.01) |

(52) U.S. Cl.
CPC ............... *A62C 37/00* (2013.01); *B05B 12/00* (2013.01); *G01S 17/08* (2013.01); *G01S 17/88* (2013.01)

(58) Field of Classification Search
USPC ..... 169/24, 35, 36, 52, 56, 43; 239/69, 159; 701/1, 50; 102/370
See application file for complete search history.

(56) References Cited

U.S. PATENT DOCUMENTS 6,922,615 B2 *  7/2005  Pillar .................... A62C 27/00
                                                    169/24
7,107,129 B2 *  9/2006  Rowe .................... A62C 27/00
                                                    169/24

* cited by examiner

CONTROL METHOD OF A FIRE TRUCK FOR HIGH-RISE AND SUPER HIGH-RISE BUILDING FIREFIGHTING

CROSS-REFERENCE TO RELATED APPLICATION

This application is the U.S. national phase entry of PCT/CN2013/079454, with an international filing date of 16 Jul. 2013, the entire disclosure of which is fully incorporated herein by reference.

TECHNICAL FIELD

The present invention relates to fire-fighting field, and more particularly relates to a control method of a fire fighting truck for high-rise and super high-rise building firefighting.

BACKGROUND ART

The fire fighting of high-rise building whose height is greater than 10 floors or greater than 24 meters and super high-rise building whose height is greater than 100 meters always is a difficult problem in fire-fighting field. The existing fire-fighting equipment at home and abroad is difficult to meet the demand of fire fighting for high-rise especially for super high-rise building because of the limited fire extinguishing height, difficult motor-driven deployment, and high price.

The elevating fire fighting truck and aerial ladder fire fighting truck are typically adopted for high-rise and super high-rise building fire fighting, at present, the highest fire fighting truck in the world is the Bronto fire fighting truck in Finland, comprising: a truck chassis, a lifting device, and an electrical system. This fire fighting truck's lifting height is 101 meters, and its water is relayed by low, medium and high area, but the highest water carrying height is only about 160 meters. This fire fighting truck cannot be rapid deployed in lots of built-up areas and narrow streets as its width is about 8 meters, length is 17.13 meters, ride height is 4 meters, and gross mass is 60.2 tons under working deployed condition. In addition, this fire fighting truck that import price is up to 22 million yuan cannot be afforded by fire departments in most of the domestic cities, but only equipped by a few cities such as Beijing, Shanghai, and Hangzhou at present.

The high-rise building fire extinguishing system, which is developed in view of the severe situation of high-rise and super high-rise building fire extinguishing in urban environment, is a special type fire extinguishing system that can be motor-driven deployed rapidly at common road surface in urban environment and used to efficiently extinguish and suppress large-area high-rise and super high-rise building fire, which adopts the mode of throwing fire extinguishing bomb to the fire source target. Overall fire-fighting efficiency of the high-rise building fire extinguishing system is determined by throwing precision of the fire extinguishing bomb.

The accurate trajectory solving mode is not used for the existing fire extinguishing bomb trajectory solving method, fire fighters realize "blind launching" to specific region according to visual judgment and practical experience, which has the problem that hitting accuracy is not high. In the time of high-rise and super high-rise building fire fighting, in order to complete all-weather close range target detection, part of the fire fighting truck is provided with a target (fire source) detection device, which has shortcomings that view field selection number is few, the ratio cannot be adjusted and magnified according to the size of target, and the infrared and white light images cannot be fused because this device adopts cameras with fixed focus as sighting telescope.

In addition, in the prior art of fire fighting by adopting fire extinguishing bomb mode, the mode of center booster is typically adopted by the fire extinguishing bomb, which will produce a large amount of high-explosive fragments with certain destructiveness when spraying fire-extinguishing agent, so that this kind of fire extinguishing bombs are applicable to regions away from dense population including forest and oil tank, but is not applicable for fire fighting of high-rise and super high-rise building under urban environment condition.

SUMMARY OF THE INVENTION

The present invention is made by this application inventor considering above-mentioned situations of the prior art. The main purpose of the present invention is to provide a control method applicable to high-rise and super high-rise building fire fighting fire fighting truck, which will solve the problem that the existing fire-fighting equipment, with limited fire extinguishing height and difficult motor-driven deployment, is difficult to meet the demand of fire fighting for high-rise and super high-rise building.

According to an embodiment of the invention, a control method applicable for high-rise and super high-rise building fire fighting truck, wherein the fire fighting truck comprises a photoelectric detection equipment (9), the photoelectric detection equipment (9) comprises an integrated processing unit, the integrated processing unit comprises an integrated scheduling module, a data memory module, a zoom control module, and a data compensation module.

the control method comprises the following steps:

before the fire fighting is performed, the photoelectric detection equipment (9) of the fire fighting truck is used for detecting fire source, comprising the following steps:

the fire source as target is aimed at by the photoelectric detection equipment (9) by utilizing the white light zoom camera, wherein, the photoelectric detection equipment (9) is rotated by utilizing the turret, so that the target is present in the visual field of the white light zoom camera and displayed on a display screen, the magnification ratio of the white light zoom camera is controlled by the zoom control module, and the aimed target is centered on the display screen and displayed completely;

according to the current magnification ratio of the white light zoom camera, the optical axis deviation value stored in the data memory module is read by the data compensation module to carry out data compensation, wherein, according to the optical axis deviation value at the current magnification ratio, the angle of the photoelectric detection equipment (9) is fine adjusted to make the white light optical axis at the current magnification ratio conform to the reference optical axes;

the laser ranging is carried out for several times by the laser rangefinder continuously, the distance values of multiple measurements are averaged by the integrated scheduling module, and this average is used as target slant distance, thus the search and measurement on target is completed by the detection device, the launching angle information of the fire extinguishing bomb is solved by the integrated processing unit based on the target slant range, and a launching command is sent to a launching apparatus according to the launching angle information, the launching of the fire extinguishing bomb to a fire source is controlled by the launching apparatus according to the launching command to carry out the fire fighting.

The embodiments of the invention have the following major advantages: by regulating the fire extinguishing bomb launching pitch angle and launching velocity, and combining trajectory data in ascending stage to calculate firing data (calculating the fire extinguishing bomb launching angle), the high-rise and super high-rise building fire fighting has the advantages of high fire extinguishing height and precision, low cost, and short reaction time, meanwhile adopting general motors chassis has characteristic of rapid motor-driven deployment and is suitable for high-rise and super high-rise building fire fighting at urban environment, which has solved the problem that the ratio cannot be adjusted and magnified according to the size of target, and the infrared and white light images cannot be fused at present stage.

BRIEF DESCRIPTION OF REFERENCE NUMERALS

1: truck chassis; 2: command control equipment; 3: launch control equipment; 4: equipment compartment; 5: launching apparatus; 6: ejection device; 7: fire extinguishing bomb; 8: turret control apparatus; 9: photoelectric detection equipment;

2-1: display control panel; 2-2: information processing machine; 2-3: communication device; 3-1: launch control execution assembly; 3-2: fire extinguishing bomb simulator;

4-1: generating set; 4-2: power supply and distribution cabinet; 4-3: servo control device;

5-1: launching turret; 5-2: launching bracket; 5-3: module assembling frame 7-1: empennage braking section; 7-2: blocking plate; 7-3: igniter; 7-4: shell; 7-5: fairing; 7-6: fuze; 7-7: piston; 7-8: combustion chamber, 7-9: fire extinguishing agent; 7-10: main charge

DETAILED DESCRIPTION OF THE INVENTION

Detailed embodiments of the present invention will be described herein with reference to the drawings below.

Figure 1:
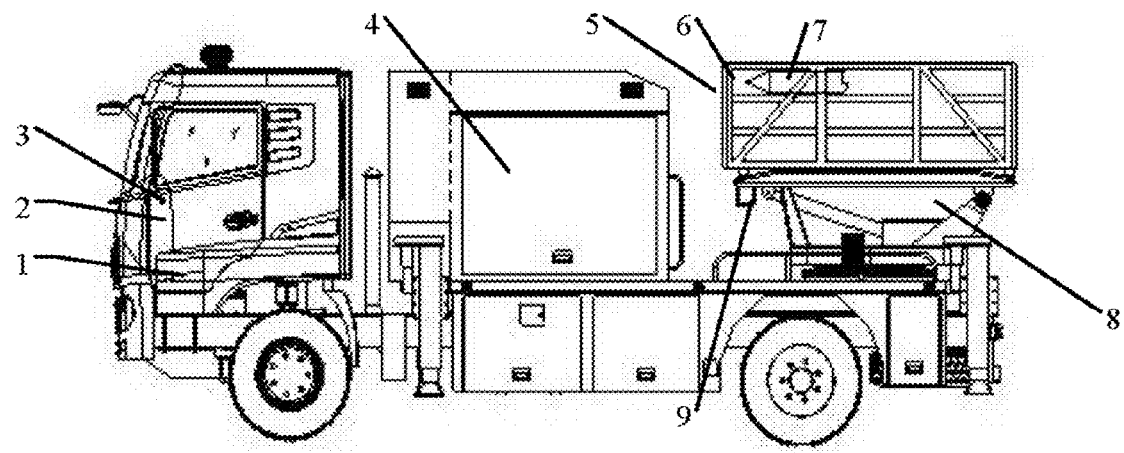
FIG. 1 is a structural schematic diagram of the fire fighting truck applicable to high-rise and super high-rise building fire fighting according to one embodiment of the invention.
Figure 2:
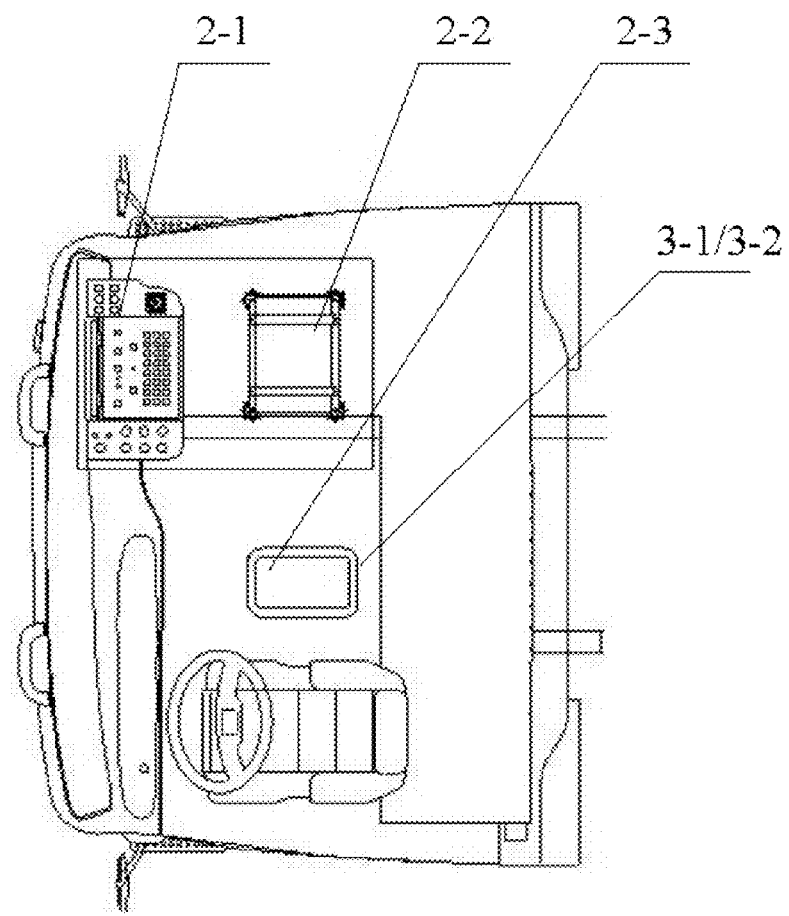
FIG. 2 is a structural schematic diagram of the cab of the fire fighting truck applicable to high-rise and super high-rise building fire fighting according to one embodiment of the invention.
Figure 3:
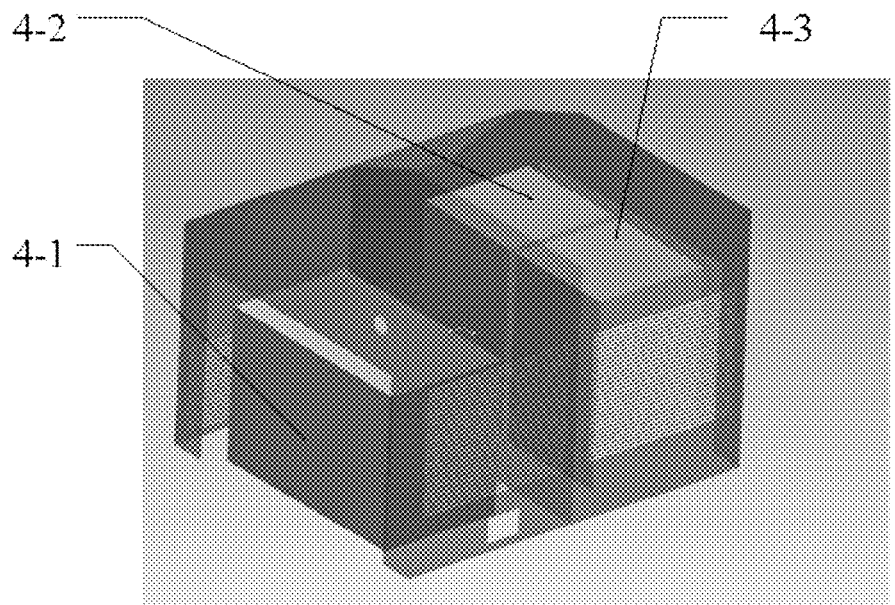
FIG. 3 is a structural schematic diagram of the equipment compartment of the fire fighting truck applicable to high-rise and super high-rise building fire fighting according to one embodiment of the invention.
Figure 4:
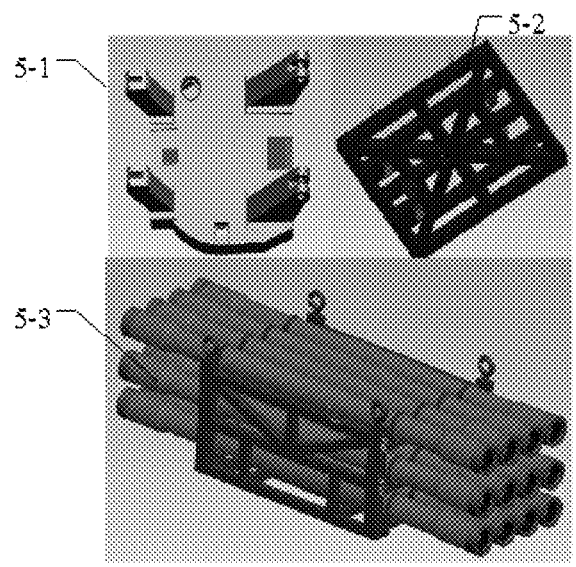
FIG. 4 is a structural schematic diagram of the launch control equipment of the fire fighting truck applicable to high-rise and super high-rise building fire fighting according to one embodiment of the invention.
Figure 5:
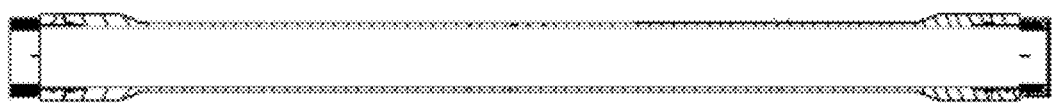
FIG. 5 is a structural schematic diagram of the ejection device of the fire fighting truck applicable to high-rise and super high-rise building fire fighting according to one embodiment of the invention.
Figure 6:
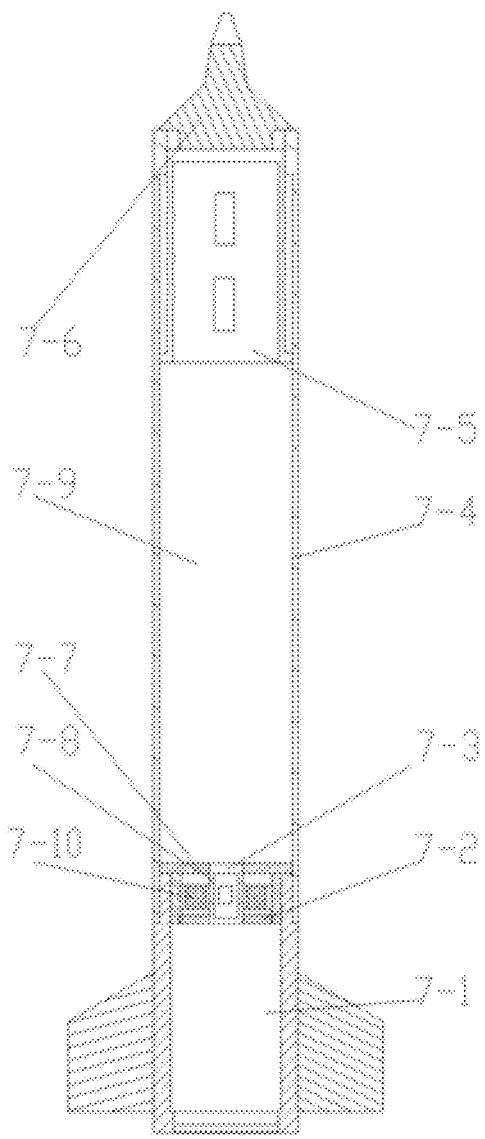
FIG. 6 is a structural schematic diagram of the fire extinguisher bomb of the fire fighting truck applicable to high-rise and super high-rise building fire fighting according to one embodiment of the invention.
Figure 7:
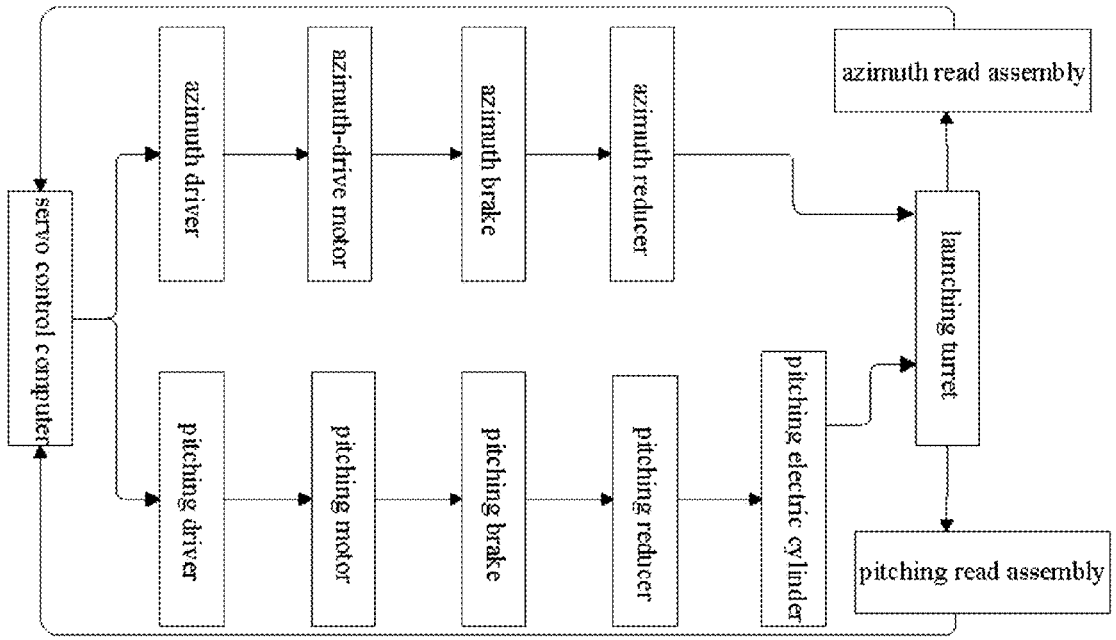
FIG. 7 is a structural schematic diagram of the servo control device of the fire fighting truck applicable to high-rise and super high-rise building fire fighting according to one embodiment of the invention.

FIG. 1 is a schematic diagram of the fire fighting truck applicable to high-rise and super high-rise building fire fighting according to one embodiment of the invention. As shown in FIG. 1, a fire fighting truck applicable to high-rise and super high-rise building fire fighting, comprising: truck chassis 1, equipment compartment 4, launching apparatus 5, ejection device 6, and fire extinguishing bomb 7.

The control system of the fire fighting truck comprises: a command control equipment 2, a launch control equipment 3, a turret control apparatus 8, and a photoelectric detection equipment 9.

Specially, the command control equipment 2 and the launch control equipment 3 are arranged at the co-pilot position of the cab of the truck chassis 1; the equipment compartment 4 is arranged in the cab and then is fixed on the truck chassis 1 with screws: the launching apparatus 5 is arranged on the truck chassis 1 and fixed by screws; the ejection device 6 is arranged and fixed on the launching apparatus 5; the fire extinguishing bomb 7 is arranged in the ejection device 6; the turret control apparatus 8 is distributed on the truck chassis and the launching apparatus for completing truck body leveling and controlling launching apparatus action; the photoelectric detection equipment 9 is arranged below the launching apparatus 5 and fixed with screws.

The truck chassis 1 comprises a general modified chassis and an auxiliary frame. Wherein the auxiliary frame, which can realize connecting functions with other related products such as the loading equipment compartment and the launching apparatus to the chassis, is a transplantable critical component configured for realizing generalization of the loading equipment on the extinguishing vehicle.

The command control equipment 2 comprises an display control panel 2-1, an information processing machine 2-2, and a communication device 2-3. In particular, the display control panel 2-1 made from sheet metal is arranged on the co-pilot position, on the display control panel 2-1, it is provided with a launch insurance switch, a display, an operating button, an indicator lamp, a control handle, and a panoramic camera, the information processing machine 2-2 is connected with the display control panel 2-1 and the communication device 2-3. The communication device 2-3 is used to communicate the operating personnel with fire alarm command and control center. The information processing machine (2-2) comprises functional modules such as an integrated management control module, a trajectory solution module and a communication module.

The launch control equipment 3 consists of a launch control execution assembly 3-1 and a fire extinguishing bomb simulator 3-2. Wherein, the launch control execution assembly 3-1 is the control equipment, which controls the switching of instructions and sends the instructions to the launching apparatus (5), receives the instructions from the information processing machine, and performs the launch control task of the fire extinguishing bomb. The fire extinguishing bomb simulator 3-2 is used for simulating on-site signals and off-frame launching signals of the fire extinguishing bomb in the extinguishing vehicle training stage.

Inside of the equipment compartment 4 comprises a generating set 4-1, a power supply and distribution cabinet 4-2, and a servo control device 4-3, and outside of that is provided with a communication antenna. The generating set comprises a diesel engine, a generator, a body support and a battery, and power supply's total power is not less than 7.3 kW. Wherein, the diesel engine is the power source of the generating set, the generator is energy conversion device which converts the mechanical energy output by the diesel engine to electric energy, and the battery provides DC control supply for the generating set that has independent fuel tank during use. The power supply and distribution equipment fixedly mounted on the right side of equipment compartment, mainly performs the switching operation to the diesel generating set and electric supply, displaying of electric parameter, power distribution and protect function.

The launching apparatus 5 comprises a launching turret 5-1, a launching bracket 5-2, and a module assembling frame 5-3. The cable is provided at the structure interior center of the launching turret 5-1. The launching bracket 5-2 that is used for supporting the module assembling frame plays a role in rapid loading the module assembling frame 5-3 and in directing during launching, and this mechanism not only realizes the locking and unlocking of the module assembling frame 5-3, but also determines the initial launching direction by cooperating with the support foot on the module assembling frame 5-3.

The ejection device 6 mainly comprises an ejection cylinder, a power plant, and a balanced body. Inside of the ejection cylinder is provided with the fire extinguishing bomb, the power plant and the balanced body. The ejection device, which adopts "confined space" balanced launching technology, has smokeless, light-free, micro-sound, and recoilless characteristics.

The fire extinguishing bomb 7 comprises: a shell 7-4, a fuze 7-6, an igniter 7-3, a fire extinguishing agent 7-9, a main charge 7-10, an empennage braking section 7-1, a combustion chamber 7-8, a blocking plate 7-2, a piston 7-7, and a fairing 7-5.

The shell 7-4, the empennage braking section 7-1 and the piston 7-7 can be lightweight metal materials: the shell 7-4 is cylindric, the empennage braking section 7-1 is arranged at bottom of the shell 7-4 and is fixed to the shell 7-4 with screws, the blocking plate 7-2 is arranged at top of the empennage braking section 7-1, the combustion chamber 7-8 is arranged at top of the blocking plate 7-2 and fixed with the blocking plate 7-2 screw thread, and the combustion chamber 7-8 is fixed to the shell 7-4 with screws. The piston 7-7 is arranged on the combustion chamber 7-8, and the internal diameter of the piston 7-7 is matched with the external diameter of the shell 7-4, the piston 7-7 center is provided with a through hole, the igniter 7-3 is arranged in the through hole of piston 7-7 and fixed with the combustion chamber 7-8 screw thread, and the main charge 7-10 is arranged in the combustion chamber 7-8. The fire extinguishing agent 7-9 is arranged in the cavity at the top of the piston 7-7 and is full of whole cavity, the fairing 7-5 is arranged at the top of the shell 7-4 and fixed with the shell 7-4 with dowels, the fairing 7-5 surface is provided with a spraying hole, and the fuze 7-6 is arranged on the fairing 7-5 and fixed with screws.

When the fire extinguishing bomb 7 works, the fuze 7-6 detects that fire extinguishing bomb is 5~10 meters away from fire source, and transmits the ignition signal to the igniter 7-3 that ignites the main charge 7-10 in the combustion chamber 7-8, combustion of the main charge 7-10 produces high pressure which pushes the piston 7-7 moving in the shell 7-4 to extrude the fire extinguishing agent 7-9 so that the pin connected between the fairing 7-5 and the shell 7-4 is cut off, the fire extinguishing agent 7-9 continues to push the fairing 7-5 to move forward and the fairing 7-5 is braked at the front end of the shell 7-4, at this moment, the spray hole has been exposed to the air, and now the piston 7-7 continues to push the fire extinguishing agent 7-9 to move forward, and the fire extinguishing agent 7-9 sprays out from the spray hole to jump on fire source that plays fire extinguishing function. In the flying-spraying process of the fire extinguishing bomb 7, the empennage braking section 7-1 releases a parachute to slow down the fire extinguishing bomb 7 that penetrates the glass curtain wall to carry out fire extinguishing through the building.

The turret control apparatus 8 is consists of turret servo equipment and truck body leveling equipment. The turret servo equipment comprises a control computer, a servo control assembly, an azimuth-drive motor, a pitch electric cylinder, a azimuth read assembly, a pitch read assembly, an azimuth servo mechanism, and a pivotal bearing, the control computer is provided with a servo control module, the azimuth read assembly and the azimuth servo mechanism are all engaged with the external tooth of the pivotal bearing.

The servo electric cylinder leveling is selected by the truck body leveling equipment, and four servo electric cylinder supporting legs are arranged on auxiliary frame of carriage chassis respectively, and the servo electric cylinder of each supporting leg is respectively driven by a motor. The leveling equipment can be manually withdrew under the situation without controlling by the information processing machine.

The leveling equipment consists of a leveling executing mechanism, a leveling control assembly, a horizontal angle measurement assembly, and a leveling control module. Wherein, four power drivers and the control computer are integrated in a leveling control cabinet, the leveling control cabinet is arranged in the middle of the equipment control cabinet.

A tilt sensor is selected by the horizontal angle measurement assembly as the levelness detecting element of the leveling equipment. The levelness of the truck body in the leveling process of the extinguishing vehicle is fed back by two horizon sensors. One horizon sensor arranged on the installed surface on chassis rotary trunnion crossbeam is the main horizon sensor, and the horizon sensor reading is the criterion of horizontal and longitudinal levelness of the truck body: another horizon sensor arranged on the front leveling cylinder crossbeam is the auxiliary horizon sensor, which feeds back horizontal levelness of head direction in the leveling process to avoid tilt phenomenon of the extinguishing vehicle head in leveling process.

Figure 8:
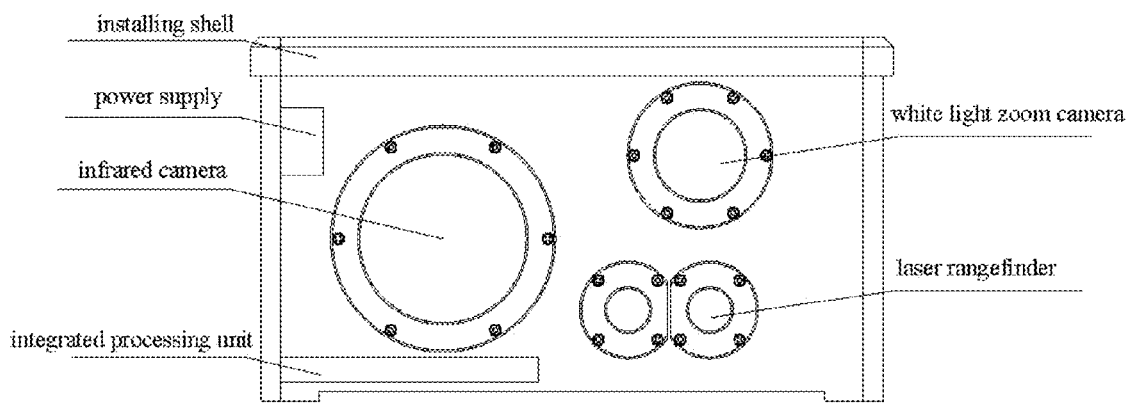
FIG. 8 is a structural schematic diagram of the photoelectric detection equipment of the fire fighting truck applicable to high-rise and super high-rise building fire fighting according to one embodiment of the invention.

FIG. 8 is a schematic diagram of the photoelectric detection equipment 9 of the fire fighting truck applicable to high-rise and super high-rise building fire fighting according to one embodiment of the invention. As shown in FIG. 8, the photoelectric detection equipment 9 comprises: an installing shell, a power supply, a white light zoom camera, an infrared camera, a laser rangefinder, and an integrated processing unit.

Figure 9:
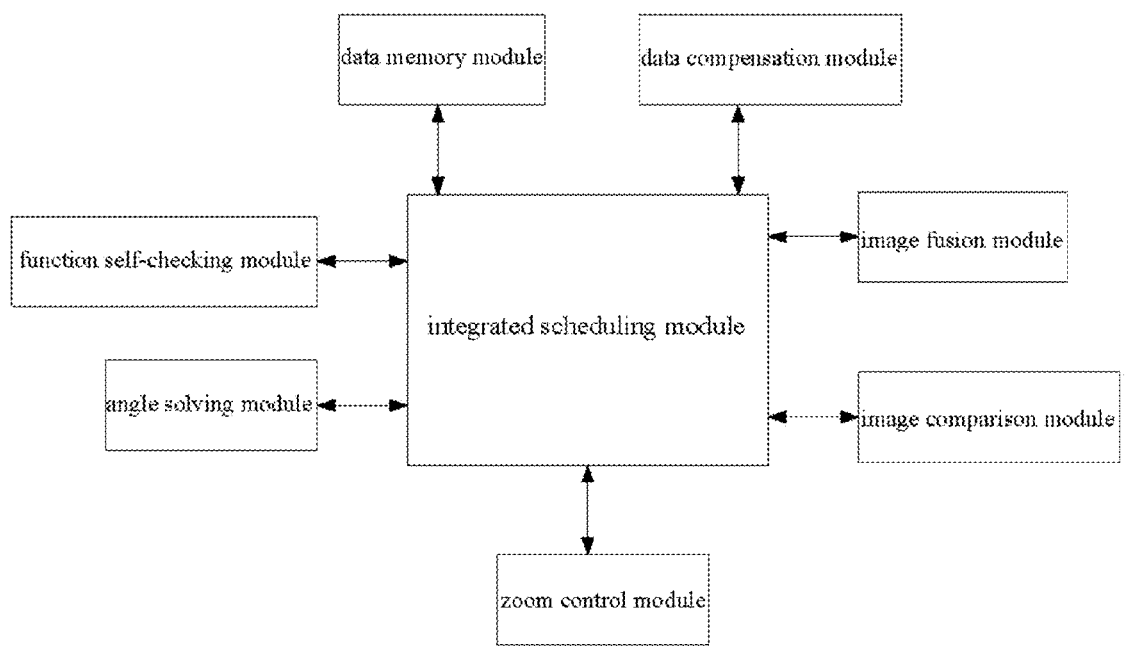
FIG. 9 is a schematic diagram of the functional module of the integrated processing unit of the photoelectric detection equipment of the fire fighting truck applicable to high-rise and super high-rise building fire fighting according to one embodiment of the invention.

FIG. 9 is a schematic diagram of the functional module of the integrated processing unit of the photoelectric detection equipment of the fire fighting truck applicable to high-rise and super high-rise building fire fighting according to one embodiment of the invention. As shown in FIG. 9, the integrated processing unit comprises an integrated scheduling module, a data memory module, a function self-checking module, a zoom control module, a data compensation module, an image fusion module, an image comparison module and an angle solving module.

Adopting the white light zoom camera, which can adjust focal length in searching process according to the distance and size of fire source, can determine the position of fire source very accurately.

The white light zoom camera is connected with the installing shell by screws, the infrared camera is connected with the installing shell by screws, the laser rangefinder is connected with the installing shell by screws, the power supply interface of the white light zoom camera is connected with the power supply by wires, the power supply interface of the infrared camera is connected with the power supply by wires, the power supply interface of the laser rangefinder is connected with the power supply by wires, the data interface of the white light zoom camera is connected with the integrated processing unit by wires, the data interface of the infrared camera is connected with the integrated processing unit by wires, and the data interface of the laser rangefinder is connected with the integrated processing unit by wires.

The workflow of the target detection of the photoelectric detection equipment 9 is described with reference to FIG. 10 below.

Figure 10:
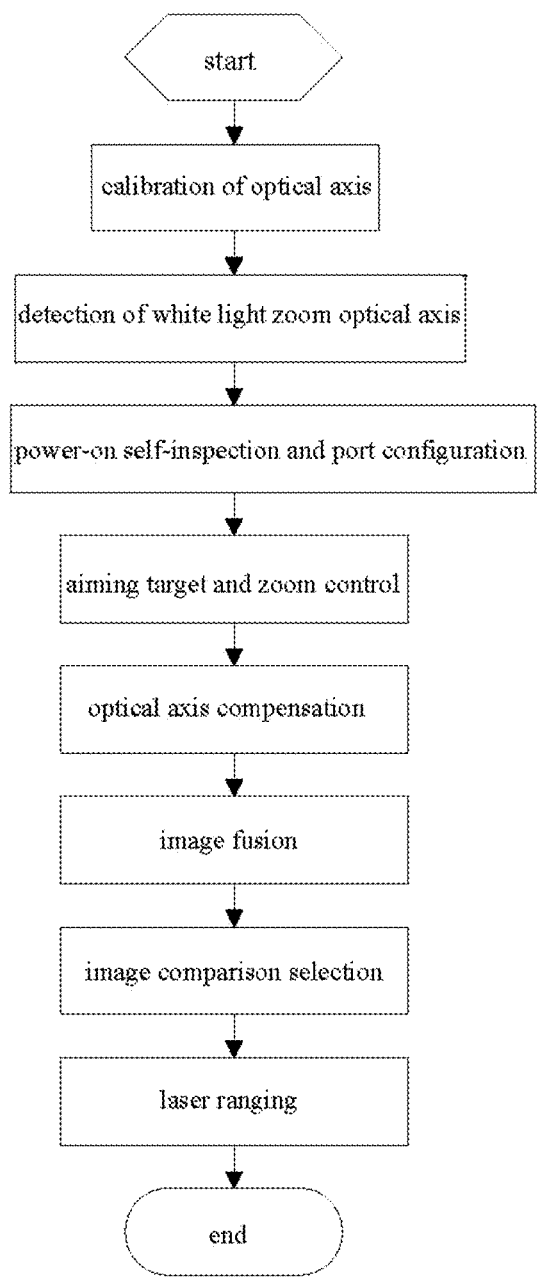
FIG. 10 is a workflow diagram the target detection (position detection) of the photoelectric detection equipment of the fire fighting truck applicable to high-rise and super high-rise building fire fighting according to one embodiment of the invention.

FIG. 10 is a workflow diagram of the target detection (position detection) of the photoelectric detection equipment 9 of the fire fighting truck applicable to high-rise and super high-rise building fire fighting according to one embodiment of the invention. As shown in FIG. 10, the target detection (fire source point aiming) performed by the photoelectric detection equipment 9 mainly includes the following steps:

The first step (optional): calibration of white light optical axis, infrared optical axis and laser axis The photoelectric detection equipment 9 may need to carry out the calibration of the white light optical axis, the infrared optical axis and the laser axis before using (for example, under the condition that photoelectric detection equipment 9 is not used for a long time, and the current reference optical axes and above-mentioned three ones are inconsistent), that is, the calibration (calibration of consistency) of the infrared optical axis, the laser axis and the white light optical axis at maximum magnification ratio, the installation axis of the white light zoom camera, the infrared camera, and the laser rangefinder are adjusted to make the white light optical axis at maximum magnification ratio, the infrared optical axis and the laser axis is in installing shell datum level±20", at this moment, above-mentioned three optical axes are supposed to meet the requirement of consistency with each other. After finishing adjustment, the mounting bracket of the white light zoom camera, the infrared camera, and the laser rangefinder are fixed on installing shell respectively, and the optical axes that are consistent with each other are used as the reference optical axes after adjustment.

The second step (optional): detection of white light zoom optical axis deviation The photoelectric detection equipment 9 may need to carry out the detection of white light zoom optical axis deviation before using (for example, under the condition that photoelectric detection equipment 9 is not used for a long time, under the condition that the current reference optical axes is not the same as the three optical axes described above), that is, zoom adjustment from the minimum magnification ratio to the maximum magnification ratio is carried out successively, the deviation value of the white light optical axis of white light zoom camera at different magnification ratios relative to the white light optical axis at the maximum magnification ratio (reference optical axis) (for example, deviation angle of the current optical axis relative to reference optical axis in three directions), and the deviation value is kept in the data memory module.

The third step: power-on self-inspection and port configuration (device initialization)

The photoelectric detection equipment 9 starts the power supply to power on the device, and the white light zoom camera, the infrared camera, the laser rangefinder, and the integrated processing unit can be powered on simultaneously. The function self-checking module carries out self-inspection and initialization to the white light zoom camera, the infrared camera, the laser rangefinder and the integrated processing module, and carries out port communication state configuration after initialization.

The fourth step: aiming target and zoom control

The target (fire source) is aimed by the photoelectric detection equipment 9 by utilizing the white light zoom camera. Specifically, the photoelectric detection equipment 9 is rotated by utilizing the turret, so that the target is present in the visual field of the white light zoom camera (and displayed on a display screen), the magnification ratio of the white light zoom camera is controlled by the zoom control module, the aimed target is centered on the display screen (target ranging image central point is aimed at target point), and height is adjusted as ¾ of the whole picture height on the display screen (also can be other ratio, only the image is displayed completely and meets definition requirement).

The fifth step: optical axis compensation

According to the current magnification ratio (the magnification ratio after aiming and zoom controlling) of the white light zoom camera, the optical axis deviation value stored in the data memory module is read by the data compensation module to carry out data compensation. That is, according to the optical axis deviation value at current magnification ratio, the angle of the photoelectric detection equipment 9 is fine adjusted to make the white light optical axis at current magnification ratio conform to the reference optical axis (i.e. new central point is aimed at target point after target ranging image data compensation).

The sixth step (optional): image fusion

Alternatively, under the condition that target images (to make the target be present in the visual field of infrared camera) are obtained by the infrared camera, the aimed and zoom controlled images by the white light zoom camera and the images obtained by the infrared camera are read by the integrated scheduling module, then, the images are fused by the image fusion module. That is, the images of the infrared camera are zoomed in or out to the magnification ratio (keep the target size consistent in two images and centered), corresponding with that of the aimed and zoom controlled images by the white light zoom camera, the transverse and longitudinal pixel numbers of the two images to be fused are made consistent by cropping the images, and the two images are fused (can be realized by various methods, for example, average the same pixel gray level, etc.) to obtain the fused image.

The seventh step (optional): image comparison selection

The acutance of the images of the white light camera and the infrared camera (under the situation that target image is obtained by the infrared camera, zoom in or out correspondingly), and/or above-mentioned fused images (under the situation that target image is obtained by the infrared camera) are compared (for example, image acutance comparison can be realized by utilizing the image processing algorithm of image filtering projecting edge, and the overall acutance of image is judged from the gradient reflected by the pixel of image at each edge) by the image comparison module to determine the images with the highest acutance as the images needed by target range finding.

The eighth step: laser ranging the laser ranging is carried out for several times (for example, 5 times) by the laser rangefinder continuously, the intermediate value three data is averaged by the integrated scheduling module after removing the maximum and minimum from five-time-metered distance, and this average value is used as target slant distance, thus the search and measurement to target is completed by the detection device.

As shown in FIG. 9, the angle solving module is used for solving the trajectory solving angle (launching angle information) of the fire extinguishing bomb. The data compensation module is also used for recording bomb axis deviation and carrying out data compensation.

The workflow of fire extinguishing bomb trajectory solving of the target detection of the photoelectric detection equipment 9 is described with reference to FIG. 10 below.

Figure 12:
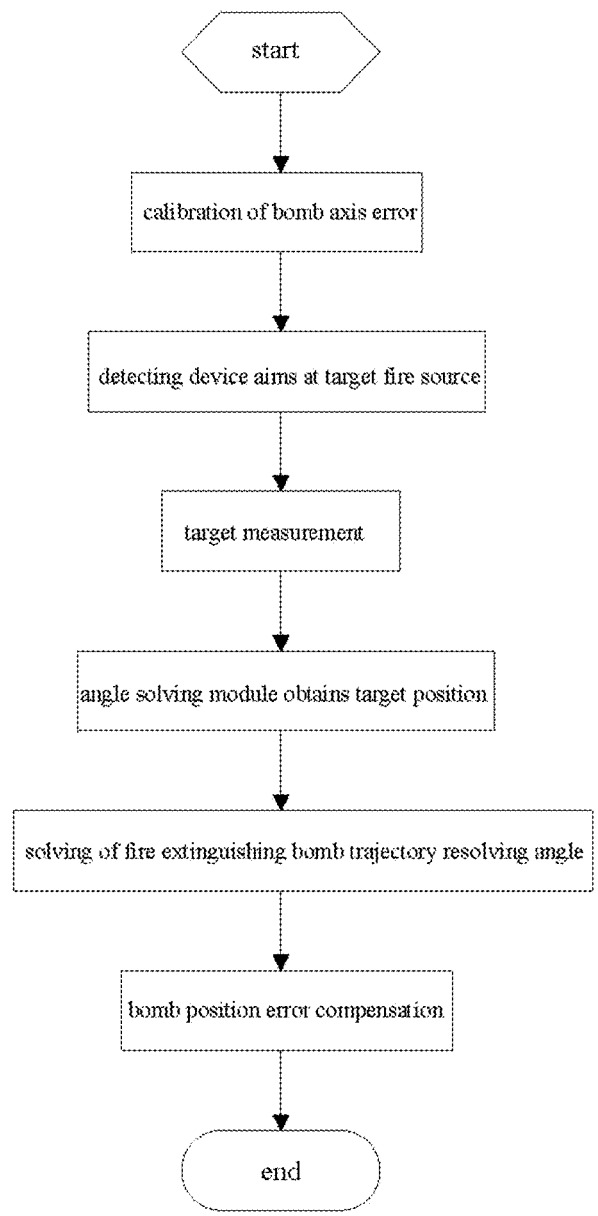
FIG. 12 is a workflow diagram of the photoelectric detection equipment of the fire fighting truck applicable to high-rise and super high-rise building fire fighting according to one embodiment of the invention.

FIG. 12 is a workflow diagram of fire extinguishing bomb trajectory solving of the photoelectric detection equipment of the fire fighting truck applicable to high-rise and super high-rise building fire fighting according to one embodiment of the invention. Specifically, after finishing the laser ranging, the oblique line distance L between the target fire source and the fire extinguishing bomb is obtained by the photoelectric detection equipment 9, meanwhile, the pitch angle θ and azimuth angle φ (for example, azimuth angle φ at the turret center can be 0) of the target relative to the turret is passed back the integrated scheduling module by the turret system, fire extinguishing bomb trajectory solving is carried out by the photoelectric detection equipment to solve the launching angle information of the fire extinguishing bomb.

That is to say, bomb launching pitch angle $\psi_f$ and launching azimuth angle $\phi_f$ are solved by the solution module according to target slant distance L and target pitch angle θ and target azimuth angle φ, so that the target can be hit when the bomb at the launching pitch angle $\psi_f$ and launching azimuth angle $\phi_f$ (under the error excepted condition, the launching azimuth angle can be the azimuth angle at the turret center, for example 0).

The specific steps of fire extinguishing bomb trajectory solving are as follows.

Figure 11:
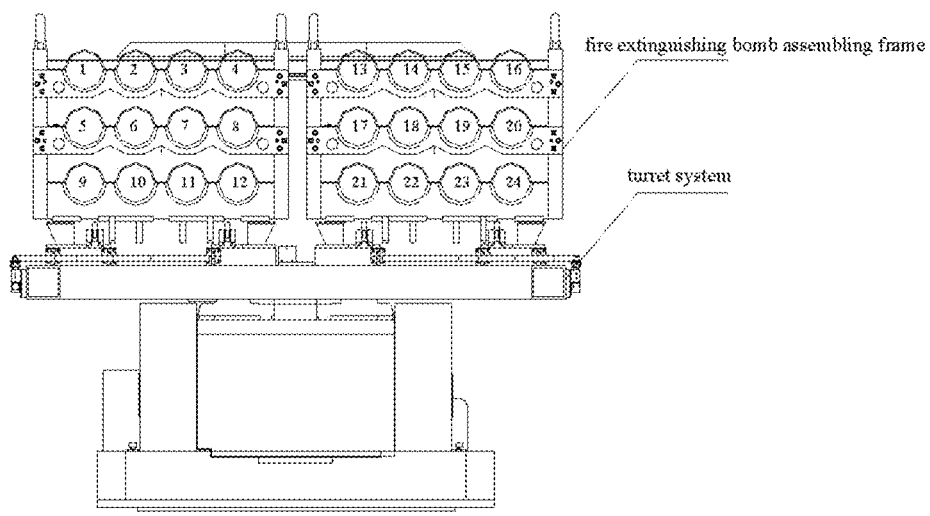
FIG. 11 is a schematic diagram of the fire extinguishing bomb assembling frame and turret system of the fire fighting truck applicable to high-rise and super high-rise building fire fighting according to one embodiment of the invention.

The first step (optional): the position and axis of the fire extinguishing bomb at different frame positions (taking 24 frame positions shown in FIG. 11 as example) are slightly different, the left-right position deviation and upper-lower position deviation of each fire extinguishing bomb assembling frame position and detection device optical axis, and course (orientation) deviation angle and pitch deviation angle are calibrated, and four deviation data are recorded in the data compensation module.

The second step: the height information of the target fire source relative to the fire extinguishing bomb and the horizontal distance ranged from the target to the launching point are obtained by solving the oblique line distance of the target and the pitch angle by the angle solving module. The solution formula is shown as follows:

$$h0 = L \times \sin\theta$$

$$d = L \times \cos\theta$$

In the formula: θ is the pitch angle of the fire extinguishing bomb assembling frame, L is the oblique line distance ranged from the fire extinguishing bomb assembling frame to the target, h0 is the height information of the target fire source relative to the fire extinguishing bomb, and d is the horizontal distance ranged from the target to the launching point.

The third step: the ejection angle of the fire extinguishing bomb is solved by the angle solving module.

The angle solving module is based on the following dynamics and the kinematical equations:

Dynamic Differential Equations $$\dot{u} - v\omega_{zt} + w\omega_{YI} = (-mg \sin\phi \cos\psi - C_A qS_M)/m \quad (1)$$

$$\dot{v} + u\omega_{zl} = [mg(\sin\phi \sin\psi \sin\gamma - \cos\phi \cos\gamma) - C_N qS_M \cos\phi']/m \quad (2)$$

$$\dot{w} - u\omega_{YI} = [mg(\sin\phi \sin\psi \cos\gamma + \cos\phi \sin\gamma) - C_N qS_M \sin\phi']/m \quad (3)$$

$$J_{YI}\dot{\omega}_{YI} = -C_N qS_M \Delta l \sin\phi' + C_{ZYI} qS_M l \omega_{YI} \quad (4)$$

$$J_{ZI}\dot{\omega}_{ZI} = C_N qS_M \Delta l \cos\phi' + C_{ZZI} qS_M l \omega_{ZI} \quad (5)$$

Kinematics Differential Equations $$\dot{X} = u \cos\phi \cos\psi - v(\sin\phi \cos\gamma + \cos\phi \sin\psi \sin\gamma) + w(\sin\phi \sin\gamma - \cos\phi \sin\psi \cos\gamma) \quad (6)$$

$$\dot{Y} = u \sin\phi \cos\psi + v(\cos\phi \cos\gamma - \sin\phi \sin\psi \sin\gamma) - w(\cos\phi \sin\gamma + \sin\phi \sin\psi \sin\gamma) \quad (7)$$

$$\dot{Z} = u \sin\psi - v \cos\psi \sin\gamma + w \cos\psi \cos\gamma \quad (8)$$

$$\dot{\phi} = (\omega_{YI} \sin\gamma + \omega_{ZI} \cos\gamma)/\cos\psi \quad (9)$$

$$\dot{\psi} = \omega_{ZI} \sin\gamma - \omega_{YI} \cos\gamma \quad (10)$$

$$\dot{\gamma} = -\dot{\phi} \sin\psi \quad (11)$$

Under force and moment effect at a certain moment, the increment of the main flight parameters of the fire extinguishing bomb are calculated by utilizing above-mentioned kinematics and dynamic differential equations. In above-mentioned kinematics and dynamic differential equations, the input (known quantity) is the flight parameters of fire extinguishing bomb at a certain moment, including: velocity, trajectory tilt angle, trajectory deflection angle, yaw rate, pitch angle velocity, pitch angle, yaw angle, roll angle and position coordinates X, Y, Z of the fire extinguishing bomb in launching coordinate system. The output is the increments (dx/dt) of above 11 parameters at this moment. Its main input and output parameters are shown in the following table.

| input | | output | |
|---|---|---|---|
| mathematical symbol | implication | mathematical symbol | implication |
| u | bomb body axial velocity | $\dot{u}$ | bomb body axial velocity increment |
| v | bomb body normal velocity | $\dot{v}$ | bomb body normal velocity increment |
| w | bomb body transverse velocity | $\dot{w}$ | bomb body transverse velocity increment |
| $\omega_{Y1}$ | yaw angle velocity | $\dot{\omega}_{Y1}$ | yaw angle velocity increment |
| $\omega_{z1}$ | pitch angle velocity | $\dot{\omega}_{Z1}$ | pitch angle velocity increment |
| $\phi$ | pitch angle | $\dot{\phi}$ | pitch angle increment |
| $\psi$ | yaw angle | $\dot{\psi}$ | yaw angle increment |
| $\gamma$ | roll angle | $\dot{\gamma}$ | roll angle increment |
| X | X-axis coordinate | $\dot{X}$ | X increment |
| Y | Y-axis coordinate | $\dot{Y}$ | Y increment |
| Z | Z-axis coordinate | $\dot{Z}$ | Z increment |

In addition, m is bomb body mass, g is acceleration of gravity, q is dynamic pressure, $C_A$ is axial force coefficient, $S_M$ is fire extinguishing bomb reference area. $C_N$ is normal force coefficient, $\phi'$ is synthetic attack angle, $J_{Y1}$ is rotary inertia around bomb body Y-axis, $J_{Z1}$ is rotary inertia around bomb body Z-axis, $C_{ZY1}=C_{ZZ1}$ is damping moment coefficient, l is fire extinguishing bomb reference length, and Δl is length from the fire extinguishing bomb barycenter to the pressure center.

The target pitch angle θ, launching off-cylinder velocity (constant, for example 160 meter per seconds), and angular velocity initial value (for example, 0) as initial conditions to solving above-mentioned differential equations, by combining with aerodynamic parameters (constant, mainly as variation of axial force coefficient, normal force coefficient, center of pressure coefficient, and damping moment coefficient along with Mach number and attack angle) of the fire extinguishing bomb, above-mentioned equations are combined and solved by using the four-order Runge-Kutta numerical solution of ordinary differential equation (ODE), and overall trajectory parameters (i.e., ballistic trajectory) u(t), v(t), w(t), $\omega_{Y1}$(t), $\omega_{Z1}$(t), X(t), Y(t), Z(t), φ(t), ψ(t), γ(t) are obtained by calculating, wherein, t is the discretized time. After calculating the overall trajectory parameters under a certain trajectory pitch angle φ (initial value φ0=θ), the range height H corresponding to the horizontal distance d is calculated at a certain trajectory pitch angle φ.

$$|H_k - h0| \leq 0.01 \quad (12)$$

$$\phi_{k+1} = \phi_k + 0.5(H_k - h0)\theta \quad (13)$$

The relationship of size H and the target height h0 is determined by using formula (12), stop the iteration if it meets formula (12), and current pitch angle k is launching pitch angle; if it does not meet formula(12), formula (13) is used to upgrade the launching pitch angle, the overall trajectory parameters and range height $H_{k+1}$ are recalculated with the dynamics and kinematics differential equations, wherein k is current iteration step number, until the difference between the range height $H_k$ and target height h0 is less than 0.01 m, launching pitch angle $\theta_k$ is the final fire extinguishing bomb launching angle by this time.

That is to say, the initial pitch angle $\phi_0$ of iteration is the target pitch angle θ, afterwards by comparing relation of the trajectory H and target height h0 at target X axial distance (i.e. horizontal distance d), the launching pitch angle is constantly corrected to finally obtain the result to hit the target.

The fourth step (optional): data compensation module performs error compensation The overall trajectory parameter is determined and calculated by taking detection device as position and azimuth reference, four deviation data of position and angle caused by different fire extinguishing bomb positions are eliminated by charge computer through compensation, thereby the pitch angle required by launching at certain unit is determined.

So far, high-rise building fire extinguishing bomb trajectory solving is completed, and the fire extinguishing bomb can be launched according to the calculated launching angle.

Finally, taking practical application as example, the workflow of the fire fighting truck applicable to high-rise and super high-rise building fire fighting according to one embodiment of the invention includes the following steps:

The first step: personnel are in place to start the vehicle and set out.

1) After receiving fire alarm, the driver and operator sit in pilot and co-pilot position respectively;
2) The driver starts the fire fighting truck, turns on backup image equipment, and drives to fire place;
3) The operator checks operation desk to guarantee that operating buttons are all at the initial position.

The second step: the generating set is started, and each device is powered and self-inspected 1) The operator turns the "units start-up" key to "START" position and loosens the key (key auto-returned "ON" position) after starting the generating set successfully, and "AC indication" lamp is on after working stably;
2) The operator presses "total power supply" button to output the generating set power supply;
3) The operator presses "equipment power supply" button, the information processing machine is powered on first for log-in and self-inspection, the information processing machine successively powers on the detection device, the servo equipment, and the leveling equipment automatically when it is normal;
4) The operator checks "device state" column in display interface, and confirms that each device in power-on and self-inspection state is "green".

The third step: selecting operation mode and stopping at a suitable place

1) The operator turns operation desk "operation mode" knob, and selects "fire-fighting" or "training" operation mode in driving process;
2) According to instruction sent by the operator according to on-the-spot fire target height, the driver observes backup image and drives the extinguishing vehicle for temporary parking near fire site;
3) The operator checks "leveling control" column state, if the extinguishing vehicle parking spot gradient exceeds±1°, the "leveling control" column indicator lamp "red & green" flicker alternately, the driver reselects place for parking, until the "leveling control" column indicator lamp stops flickering, and "recovery" indicator lamp is green;
4) The driver controls the extinguishing vehicle parking, gets off, and is responsible for observing the situation of extinguishing vehicle within launching safe distance, and communicates with operator in time.

The fourth step: unfolding leveling to aim at fire target
1) The operator turns operation desk "leveling control" knob to "unfolding" position, the extinguishing vehicle automatic leveling unfolds, "unfolding" indicator lamp flickers in leveling process, after finishing leveling, operation desk "unfolding" indicator lamp is on, and display interface "leveling control" column "unfolding" lamp turns to "green";

2) The launching turret turns to unlock;

3) The operator controls operation desk handle, observes display interface image, switches to "imaging pattern" (showing the viewfinder image of white light camera on the screen display), controls launching turret turning, and aims the display interface "+" to fire target, and now "current angle" column shows launching turret current position angle.

The fifth step: measuring the target location, and solving firing data (launching angle)

1) Under the situation that the target range can be measured accurately with the laser rangefinder directly, the operator controls the button on the handle to measure fire target location parameter, "target location" column display target "distance" and "height" data;

2) Under the situation that the target range cannot be measured accurately with the laser rangefinder directly (i.e. aiming at A but launching B), the actual fire point is point B which cannot meet accuracy requirement of the laser rangefinder, the point A near the point B is aimed for range finding, according to the change in location between point A and point B, the point A range data is transformed into point B range data, and then firing data at point B is calculated.

3) The command and control device, according to target data, solves firing data automatically, and judges whether the solved result is effective (the azimuth angle and pitch angle whether in the limited range) simultaneously, and the effective solved results are shown in "launching angle" column.

The sixth step: selecting launching mode and unlocking launching insurance

1) The operator selects operation desk "launching mode" to "manual" or "automatic" pattern;

2) The operator turns operation desk "launching insurance" key to "unlock" position, and starts to record video;

3) The operator keeps in touch with the driver outside of the car, and confirms that there are no people in launching safe region.

The seventh step: turning the launching turret and launching the fire extinguishing bomb 1). when the operator selects "launching mode" to be "automatic", the "launching button" indicator lamp with launching conditions is on, the operator presses the "launching button" corresponding to launching fire extinguishing bomb to be launched, according to the solved results corresponding to this fire extinguishing bomb, the information processing machine automatically controls the launching turret to turn to the target launching angle, "allow launching" indicator lamp on the operation desk is on, and the fire extinguishing bomb is launched;

2) when the operator selects "launching mode" to be "manual", the "allow launching" indicator lamp is first extinguished, the operator first controls the operation desk handle to turn to launching turret to launching angle, that is "current angle" column number value and "launching angle" column number value are within certain error range, now the "allow launching" indicator lamp is on, the "firing button" indicator lamp with launching conditions is on, and the operator presses the "launching button" for launching the fire extinguishing bomb.

The eighth step: the fire extinguishing bomb launching 1) the launch control equipment provides igniting timing signal;

2) the igniting timing signal is delivered to launching cylinder igniter by module cable box;

3) the launching cylinder propellant powder is ignited, and the fire extinguishing bomb is launched out of the cylinder at certain initial velocity The ninth step: time-delay propellant self-destruction timing starts 1) Time-delay propellant starts self-destruction timing under the effect of launching shock overload. When delay time is up, the time-delay propellant controls the fire extinguishing bomb to open parachute and spray fire-extinguishing agent at the same time, and the fire extinguishing bomb is self-destructed.

The tenth step: fuze starting to work

1) High-rise fire mainly contains three kinds of situations including indoor fire, external walls fire, and fire inside the walls, this paper puts emphasis on considering putting out indoor fire to describe the workflow of fuze.

Wherein, the fuze starting to work in the tenth step includes two sub-steps:

Sub-step 10-1, relieve fuze insurance, and start function.

1) The fuze detects and approaches the target

2) The fuze machine insurance is unlocked

3) Under the effect of launching shock overload, machinery insurance of the fuze is unlocked due to inertia, and the firing circuit turns to off-state from short circuit state;

4) fuze long distance releasing insurance is unlocked

5) After the fuze delaying set time, long distance releasing insurance (electricity insurance) release, and fuze is in state of readiness;

6) fuze self-destruction timing starting

7) The fuze circuit works, starts self-destruction time-delay, the fuze, time-delay propellant and fire extinguishing bomb main charge are connected in parallel to improve fire extinguishing bomb self-destruction reliability. When delay time is up, the fuze controls the fire extinguishing bomb to open parachute and spray fire-extinguishing agent at the same time, and the fire extinguishing bomb is self-destructed.

Sub-step 10-2: fuze triggering

The fuze or time-delay propellant provides ignition signal, and the fire extinguishing bomb sprays fire-extinguishing agent simultaneously after receiving the ignition signal, and opens a parachute to slow down.

The various functions of fuze are set as follows:

1) the fuze is mainly applied in proximity trigger function;

2) the fuze impact function is used as supplement after proximity function failure, which guarantees that the fire extinguishing bomb sprays fire-extinguishing agent for fire extinguishing in time after arriving conflagration area;

3) The fuze self-destroying function is that provides ignition signal regularly and forcedly under situation that the fire extinguishing bomb departs from trajectory and does not meet proximity and impact triggering condition, or failure of proximity and impact function at the same time, which can avoid that the fire extinguishing bomb to carry initiating explosive device freely falling, and cause harm to personnel and equipment, or the residual initiating explosive device on the fire extinguishing bomb causes dangerous to reclaim.

The eleventh step: fire extinguishing bomb action

1) The fire extinguishing bomb drag parachute finishes air inflation before the fire extinguishing bomb getting into the room and possess deceleration conditions, and the drag parachute cannot exert an influence to fire extinguishing bomb trajectory before the fire extinguishing bomb getting into the room;
2) after the fire extinguishing bomb getting into the room, the drag parachute draws the fire extinguishing bomb to slow down, so that the fire extinguishing bomb does not break up after hitting against the wall, and wall body is not penetrated;
3) The fire extinguishing bomb continues spraying fire-extinguishing agent in action process of the drag parachute, and inflation time of the drag parachute and total time of fire extinguishing bomb spraying fire-extinguishing agent accounts for not more than 30%.

The twelfth step: the time-delayed propellant self-destruction triggering

1) The time-delayed propellant self-destruction function is identical with the fuze self-destruction function, but the two are installed independently, and do not interfere with each other. The object is to improve use security of the fire extinguishing bomb under abnormal operation situation. Meanwhile, it is also can be used for supplementing fire-extinguishing function after fuze failure when the fire extinguishing bomb getting the room.
2) After launching the fire extinguishing bomb, 3000 g overload is produced, the time-delayed propellant starts triggering timing automatically, after delaying 8 s by the time-delayed propellant, the self-destruction ignition signal is forced to provide.

The time-delayed propellant self-destruction work process is as follows:

After launching the fire extinguishing bomb, time-delayed propellant self-destruction time delay starts timing 8 s automatically;

When time-delayed propellant self-destruction time delay timing time is up, automatic self-destruction ignition signal is forced to provide;

After receiving ignition signal, the fire extinguishing bomb triggers payload section and safe braking section to work simultaneously, the payload section sprays fire-extinguishing agent, and the safe braking section opens a parachute.

The thirteenth step: the system is withdraw, and the equipment is power off

1) The operator turns the operation desk "launch insurance" key to "locking" position, and "allow launching" lamp is extinguished, and video recording is stopped;
2) The operator turns the operation desk "leveling control" knob to "recovery" position, system is started to withdraw, the launching turret is returned to normal position automatically by the system (azimuth angle is 0°, pitch angle is 0°), then four leveling supporting legs are reclaimed to initial position, the "recovery" lamp flickers, and the "recovery" lamp is on after putting in place;
3) The operator turns the operation desk "operation mode" knob to "training" state;
4) The operator presses the operation desk "equipment power supply" button, first the information processing machine closes subsystem device power supply (DPS), then closes the information processing machine power supply;
5) The operator presses the operation desk "total power supply" button, shutdown system power supply;
6) The operator turns the operation desk "units start-up" key, to "OFF" position, the generating set is closed, and "AC indication lamp" is extinguished;

The fourteenth step: the vehicle returns for flame-out, and personnel gets off

1) The driver gets on to the driver position, and starts the fire fighting truck and returns to guard station;
2) The driver closes backup image equipment, and closes fire fighting truck;
3) The driver and operator get off.

The invention claimed is:

1. A control method of a fire fighting truck for high-rise and super high-rise building firefighting, characterized in that the fire fighting truck comprises a photoelectric detection equipment (9), the photoelectric detection equipment (9) comprises an installing shell, a power supply, a white light zoom camera, an infrared camera, a laser rangefinder, and an integrated processing unit, the integrated processing unit comprises an integrated scheduling module, a data memory module, a zoom control module, and a data compensation module, the control method comprises the following steps:

before the fire fighting is performed, the photoelectric detection equipment (9) of the fire fighting truck is configured for detecting the fire source, comprising the following steps:

the fire source as a target is aimed at by the photoelectric detection equipment (9) by utilizing the white light zoom camera, wherein, the photoelectric detection equipment (9) is rotated by utilizing the turret, so that the target is present in the visual field of the white light zoom camera and displayed on a display screen, the magnification ratio of the white light zoom camera is controlled by the zoom control module, and the aimed target is centered on the display screen and displayed completely;

according to the current magnification ratio of the white light zoom camera, the optical axis deviation value stored in the data memory module is read by the data compensation module to carry out data compensation, wherein, according to the optical axis deviation value at the current magnification ratio, the angle of the photoelectric detection equipment (9) is fine adjusted to make the white light optical axis at the current magnification ratio conform to the reference optical axis;

the laser ranging is carried out for several times by the laser rangefinder continuously, the distance values of multiple measurements are averaged by the integrated scheduling module, and this average is used as a target slant distance, thus the search and measurement of the target is completed by the photoelectric detection equipment (9), launching angle information of a fire extinguishing bomb is solved by the integrated processing unit according to a target slant range, and a launching command is sent to a launching device according to the launching angle information, the launching of the fire extinguishing bomb to the fire source is controlled by the launching device according to the launching command to carry out the fire fighting.

2. The control method according to claim 1, wherein, before detecting fire source, the photoelectric detection equipment (9) is further configured to carry out the following steps:

under the condition that the current reference optical axis and the above-mentioned three ones are inconsistent, the optical axes of the white light zoom camera, the infrared camera and the laser rangefinder are calibrated, the optical axis of the infrared camera, the optical axis of the laser rangefinder, and the optical axis of the white light zoom camera at maximum magnification ratio are adjusted to be consistent, and the optical axes that are consistent with each other are used as the reference optical axes after calibration.

3. The control method according to claim 2, wherein, before detecting fire source, the photoelectric detection equipment (9) is further configured for carrying out the following steps:

the optical axis deviation of the white light zoom is detected, wherein, the zoom is adjusted from the minimum magnification ratio to the maximum magnification ratio successively, the optical axis deviation values of the white light optical axis of the white light zoom camera at different magnification ratios relative to the reference optical axes are detected and stored in the data memory module.

4. The control method according to claim 3, wherein, the integrated processing unit further comprises a function self-checking module, and before detecting fire source, the photoelectric detection equipment (9) is further configured to carry out the following steps:

the power supply is started to power the equipments, the white light zoom camera, the infrared camera, the laser rangefinder, and the integrated processing unit simultaneously, the white light zoom camera, the infrared camera, the laser rangefinder and the integrated processing module are self-checked and initialized by the function self-checking module, and the ports communication state is configured after initialization.

5. The control method according to claim 2, wherein, the integrated processing unit further comprises an image fusion module, and the detection of fire source performed by the photoelectric detection equipment (9) further comprises the following steps:

under the condition that target images are obtained by the infrared camera, the aimed and zoom controlled images by the white light zoom camera and the images obtained by the infrared camera are read by the integrated scheduling module, then, the images are fused by the image fusion module, wherein, the images of the infrared camera are zoomed in or out to the magnification ratio corresponding with that of the aimed and zoom controlled images by the white light zoom camera, the transverse and longitudinal pixel numbers of the two images to be fused are made consistent by cropping the images, and the two images are fused to obtain the fused image, wherein, the integrated processing unit further comprises an image comparison module, and the detection of fire source performed by the photoelectric detection equipment (9) further comprises the following steps:

the acutance of the images of the white light camera, the infrared camera, and/or the above-mentioned fused images are compared by the image comparison module to determine the images with the highest acutance as the images needed by target range finding.

6. The control method according to claim 2, wherein, the integrated processing unit further comprises an angle solving module, wherein, the angle solving module is configured to solve the launching angle information of the fire extinguishing bomb, wherein, after finishing the laser ranging, the oblique line distance L between the target fire source and the fire extinguishing bomb is obtained by the photoelectric detection equipment (9), meanwhile, the pitch angle θ of the target relative to the turret is passed back to the integrated scheduling module by the turret system, and fire extinguishing bomb trajectory solving is carried out by the photoelectric detection equipment (9) to solve the launching angle information of the fire extinguishing bomb, wherein, the solving of the launching angle information of the fire extinguishing bomb performed by the photoelectric detection equipment (9) comprises the following steps:

the angle solving module is based on the following dynamics and kinematics differential equations:

the dynamics differential equations $$\dot{u} - v\omega_{zI} + w\omega_{YI} = (-mg \sin \phi \cos \psi - C_A q S_M)/m \quad (1)$$

$$\dot{v} + u\omega_{zI} = [mg(\sin \phi \sin \psi \sin \gamma - \cos \phi \cos \gamma) - C_N q S_M \cos \phi']/m \quad (2)$$

$$\dot{w} - u\omega_{YI} = [mg(\sin \phi \sin \psi \cos \gamma + \cos \phi \sin \gamma) - C_N q S_M \sin \phi']/m \quad (3)$$

$$J_{YI}\dot{\omega}_{YI} = -C_N q S_M \Delta l \sin \phi' + C_{ZYI} q S_M l \omega_{YI} \quad (4)$$

$$J_{ZI}\dot{\omega}_{ZI} = C_N q S_M \Delta l \cos \phi' + C_{ZZI} q S_M l \omega_{ZI} \quad (5)$$

the kinematics differential equations $$\dot{X} = u \cos \phi \cos \psi - v(\sin \phi \cos \gamma + \cos \phi \sin \psi \sin \gamma) + w (\sin \phi \sin \gamma - \cos \phi \sin \psi \cos \gamma) \quad (6)$$

$$\dot{Y} = u \sin \phi \cos \psi + v(\cos \phi \cos \gamma - \sin \phi \sin \psi \sin \gamma) - w (\cos \phi \sin \gamma + \sin \phi \sin \psi \sin \gamma) \quad (7)$$

$$\dot{Z} = u \sin \psi - v \cos \psi \sin \gamma + w \cos \psi \cos \gamma \quad (8)$$

$$\dot{\phi} = (\omega_{YI} \sin \gamma + \omega_{ZI} \cos \gamma)/\cos \psi \quad (9)$$

$$\dot{\psi} = \omega_{ZI} \sin \gamma - \omega_{YI} \cos \gamma \quad (10)$$

$$\dot{\gamma} = -\dot{\phi} \sin \psi \quad (11)$$

In the above-mentioned kinematics and dynamic differential equations, the input and output are shown in the table below:

| input | | output | |
|---|---|---|---|
| mathematical symbol | implication | mathematical symbol | implication |
| $u$ | bomb body axial velocity | $\dot{u}$ | bomb body axial velocity increment |
| $v$ | bomb body normal velocity | $\dot{v}$ | bomb body normal velocity increment |
| $w$ | bomb body transverse velocity | $\dot{w}$ | bomb body transverse velocity increment |
| $\omega_{YI}$ | yaw angle velocity | $\dot{\omega}_{YI}$ | yaw angle velocity increment |
| $\omega_{ZI}$ | pitch angle velocity | $\dot{\omega}_{ZI}$ | pitch angle velocity increment |
| $\phi$ | pitch angle | $\dot{\phi}$ | pitch angle increment |
| $\psi$ | yaw angle | $\dot{\psi}$ | yaw angle increment |
| $\gamma$ | roll angle | $\dot{\gamma}$ | roll angle increment |

-continued

| input | | output | |
|---|---|---|---|
| mathematical symbol | implication | mathematical symbol | implication |
| X | X-axis coordinate | $\dot{X}$ | X increment |
| Y | Y-axis coordinate | $\dot{Y}$ | Y increment |
| Z | Z-axis coordinate | $\dot{Z}$ | Z increment | wherein, m is bomb body mass, g is acceleration of gravity, q is dynamic pressure, $C_A$ is axial force coefficient, $S_M$ is fire extinguishing bomb reference area, $C_N$ is normal force coefficient, $\phi'$ is synthetic angle of attack, $J_{YI}$ is rotary inertia around bomb body Y-axis, $J_{ZI}$ is rotary inertia around bomb body Z-axis, $C_{ZYI}=C_{ZZI}$ is damping moment coefficient, l is fire extinguishing bomb reference length, and $\Delta l$ is length from the fire extinguishing bomb barycenter to the pressure center, the above-mentioned equations are jointly solved by the fourth-order Runge-Kutta numerical solution of ordinary differential equation (ODE), overall trajectory parameters $u(t), v(t), w(t), \omega_{YI}(t), \omega_{ZI}(t), X(t), Y(t), Z(t), \phi(t), \psi(t), \gamma(t)$ are obtained by calculating, wherein, t is discretized time.

7. The control method according to claim 6, wherein, the angle solving module is further configured to carry out the following steps:

the height h0 of the target fire source relative to the fire extinguishing bomb and the horizontal distance d between the target and the launching point are obtained by solving the oblique line distance L of the target and the pitch angle θ of the target relative to the turret according to the following formula:

$$h0 = L \times \sin\theta$$

$$d = L \times \cos\theta$$

after calculating the overall trajectory parameters under a certain trajectory pitch angle φ, the range height H corresponding to the horizontal distance d is calculated at a certain trajectory pitch angle φ, wherein the initial value φ0=θ, shown as follows:

$$|H_k - h0| \leq 0.01 \quad (12)$$

$$\phi_{k+1} = \phi_k + 0.5(H_k - h0)\theta \quad (13)$$

the relationship of size between H and the target height h0 is determined by using formula (12), stop the iteration if it meets formula (12), and current pitch angle $\phi_k$ is the final fire extinguishing bomb launching pitch angle; if it does not meet formula (12), formula (13) is used to upgrade the launching pitch angle, the overall trajectory parameters and range height $H_{k+1}$ are recalculated with the dynamics and kinematics differential equations, wherein k is current iteration step numbers, until the range height $H_k$ and target height h0 satisfies formula (12), pitch angle φk is the final fire extinguishing bomb launching pitch angle of this time.

8. The control method according to claim 1, wherein, the fire fighting truck comprises a truck chassis (1), an equipment compartment (4), a launching apparatus (5), an ejection device (6), and fire extinguishing bombs (7), the truck chassis (1) consists of a general modified chassis and an auxiliary frame, the command control equipment (2) comprises an display control panel (2-1), an information processing machine (2-2), and a communication device (2-3), wherein, the display control panel (2-1) made from sheet metal is arranged on the co-pilot position, a launch insurance switch, a display, an operating button, an indicator lamp, a control handle, and a panoramic camera are provided on the display control panel (2-1), the information processing machine (2-2) is connected with the display control panel (2-1) and the communication device (2-3), the communication device (2-3) is used for the communication between the operator and fire alarm command and control center, and the information processing machine (2-2) comprises an integrated management control module, a trajectory solving module and a communication module.

9. The control method according to claim 8, wherein, the launch control equipment (3) consists of a launch control execution assembly (3-1) and a fire extinguishing bomb simulator (3-2), wherein, the launch control execution assembly (3-1) sends the control instructions to the launching apparatus (5), the launching apparatus (5) receives the instructions from the information processing machine, and performs the launch control task of the fire extinguishing bomb, the fire extinguishing bomb simulator (3-2) is used for simulating signals in situ and off-frame launching signals of the fire extinguishing bomb in the extinguishing vehicle training stage, wherein, the inside of the equipment compartment (4) comprises a generating set (4-1), a power supply and distribution cabinet (4-2), and a servo control device (4-3), and the outside of the equipment compartment (4) is provided with a communication antenna, wherein, the launching apparatus (5) consists of a launching turret (5-1), a launching bracket (5-2), and a module assembling frame (5-3), and the cable is provided at the center of inner structure of the launching turret (5-1), the launching bracket (5-2) configured for supporting the module assembling frame plays a role in rapid loading the module assembling frame (5-3) and in directing during launching, and the launching bracket (5-2) not only realizes the locking and unlocking of the module assembling frame (5-3), but also determines the initial launching direction by cooperating with the support foot on the module assembling frame (5-3), wherein, the ejection device (6) comprises an ejection cylinder, a power plant, and a balanced body, the inside of the ejection cylinder is provided with the fire extinguishing bomb, the power plant and the balanced body.

10. The control method according to claim 1, wherein, the turret control apparatus (8) consists of a turret servo equipment and a truck body leveling equipment, the turret servo equipment comprises a control computer, a servo control assembly, an azimuth-drive motor, a pitch electric cylinder, an azimuth read assembly, a pitch read assembly, an azimuth servo mechanism, and a pivotal bearing, the control computer is provided with a servo control module, the azimuth read assembly and the azimuth servo mechanism are all engaged with the external tooth of the pivotal bearing, wherein, the truck body leveling equipment comprises a leveling executing mechanism, a leveling control assembly, and a horizontal angle measurement assembly, provided with a leveling control module, wherein, four power drivers and the control computer are integrated in a leveling control cabinet, the leveling control cabinet is arranged in the middle of the equipment control cabinet, the levelness of the truck body in the leveling process of the fire fighting truck is fed back by two horizon sensors, wherein one horizon sensor arranged on the installed surface on chassis rotary trunnion crossbeam is the main horizon sensor, of which the horizon sensor reading is the criterion of horizontal and longitudinal levelness of the truck body, the other horizon sensor arranged on the front leveling oil cylinder crossbeam is the auxiliary horizon sensor, which feeds back horizontal levelness of head direction in the leveling process.

* * * * *